(12) United States Patent
Kim et al.

(10) Patent No.: US 9,103,710 B2
(45) Date of Patent: Aug. 11, 2015

(54) APPARATUS AND METHOD OF MONITORING FLOW OF LIQUID IN PIPE

(75) Inventors: Tae Joon Kim, Daejeon (KR); Ji Young Jeong, Daejeon (KR); Yong Bum Lee, Daejeon (KR); In Koo Hwang, Daejeo (KR); Jae Hyuk Eoh, Gyeonggi-do (KR); Jong Man Kim, Daejeon (KR); Yeong Ii Kim, Daejeon (KR)

(73) Assignees: Korea Atomic Energy Research Institute (KR); Korea Hydro & Nuclear Power Co. Ltd. (KR)

( * ) Notice: Subject to any disclaimer, the term of this patent is extended or adjusted under 35 U.S.C. 154(b) by 632 days.

(21) Appl. No.: 13/334,584

(22) Filed: Dec. 22, 2011

(65) Prior Publication Data

US 2012/0304760 A1 Dec. 6, 2012

(30) Foreign Application Priority Data

May 30, 2011 (KR) .................. 10-2011-0051379

(51) Int. Cl.
*G01F 1/68* (2006.01)
*G01F 23/24* (2006.01)
*G01F 1/688* (2006.01)

(52) U.S. Cl.
CPC ............ *G01F 23/241* (2013.01); *G01F 1/6888* (2013.01); *G01F 23/248* (2013.01)

(58) Field of Classification Search
None
See application file for complete search history.

(56) References Cited

U.S. PATENT DOCUMENTS 7,000,464 B2 * 2/2006 McMillan et al. ......... 73/204.21

FOREIGN PATENT DOCUMENTS

KR 1020060134161 A 12/2006

* cited by examiner

*Primary Examiner* — Lisa Caputo
*Assistant Examiner* — Brandi N Hopkins
(74) *Attorney, Agent, or Firm* — Warn Partners, P.C.

(57) ABSTRACT

An apparatus and method for monitoring a flow of liquid in a pipe are provided. The apparatus may include a temperature sensor attached to a pipe of a heat exchanger system to measure a temperature of the pipe, and a controller to determine whether a liquid is present in the pipe, based on a change in the measured temperature.

6 Claims, 10 Drawing Sheets

APPARATUS AND METHOD OF MONITORING FLOW OF LIQUID IN PIPE

CROSS-REFERENCE TO RELATED APPLICATIONS

This application claims the benefit of Korean Patent Application No. 10-2011-0051379, filed on May 30, 2011, in the Korean Intellectual Property Office, the disclosure of which is incorporated herein by reference.

FIELD OF THE INVENTION

The present invention relates to a technology for monitoring a flow of liquid in a pipe using a change in temperature of the pipe.

BACKGROUND OF THE INVENTION

A heat exchanger system may transfer, through a pipe, a liquid to an upper storage container by pumping the liquid into a lower storage container.

In this instance, a state of a flow of liquid in the pipe may need to be verified in order to verify an operational state of the heat exchanger system.

Accordingly, there is a need for a technology for verifying a state of a flow of liquid in a pipe using a change in temperature of the pipe.

SUMMARY OF THE INVENTION

An aspect of the present invention provides an apparatus and method that may determine whether a liquid is present in a pipe based on a change in temperature of the pipe in a heat exchanger system, and may provide an indicator indicating whether a liquid is present, thereby increasing operating efficiency and safety during an operation of the heat exchanger system.

Another aspect of the present invention also provides an apparatus and method that may determine whether a liquid is present within a first point and a second point of a pipe based on changes in temperature corresponding to a plurality of points of the pipe in a heat exchanger system, and may turn ON indicators with respect to the first point and the second point, sequentially, when it is determined that a liquid is present at each point, thereby easily providing a state of a flow of liquid from the first point to the second point of the pipe.

According to an aspect of the present invention, there is provided an apparatus for monitoring a flow of liquid in a pipe, the apparatus including a temperature sensor attached to a pipe of a heat exchanger system to measure a temperature of the pipe, and a controller to determine whether a liquid is present in the pipe, based on a change in the measured temperature.

According to another aspect of the present invention, there is provided a method of monitoring a flow of liquid in a pipe, the method including measuring a temperature of a pipe within a heat exchanger system, and determining whether a liquid is present in the pipe, based on a change in the measured temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

EFFECT OF THE INVENTION

According to an embodiment of the present invention, operating efficiency and safety during an operation of a heat exchanger system may increase by determining whether a liquid is present in a pipe based on a change in temperature of the pipe in the heat exchanger system, and providing an indicator indicating whether a liquid is present.

According to an embodiment of the present invention, a state of a flow of liquid from a first point to a second point of a pipe may be provided easily by determining whether a liquid is present within the first point and the second point of the pipe based on changes in temperature corresponding to a plurality of points of the pipe in a heat exchanger system, and may turn ON indicators with respect to the first point and the second point, sequentially, when it is determined that a liquid is present at each point.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Figure 1:
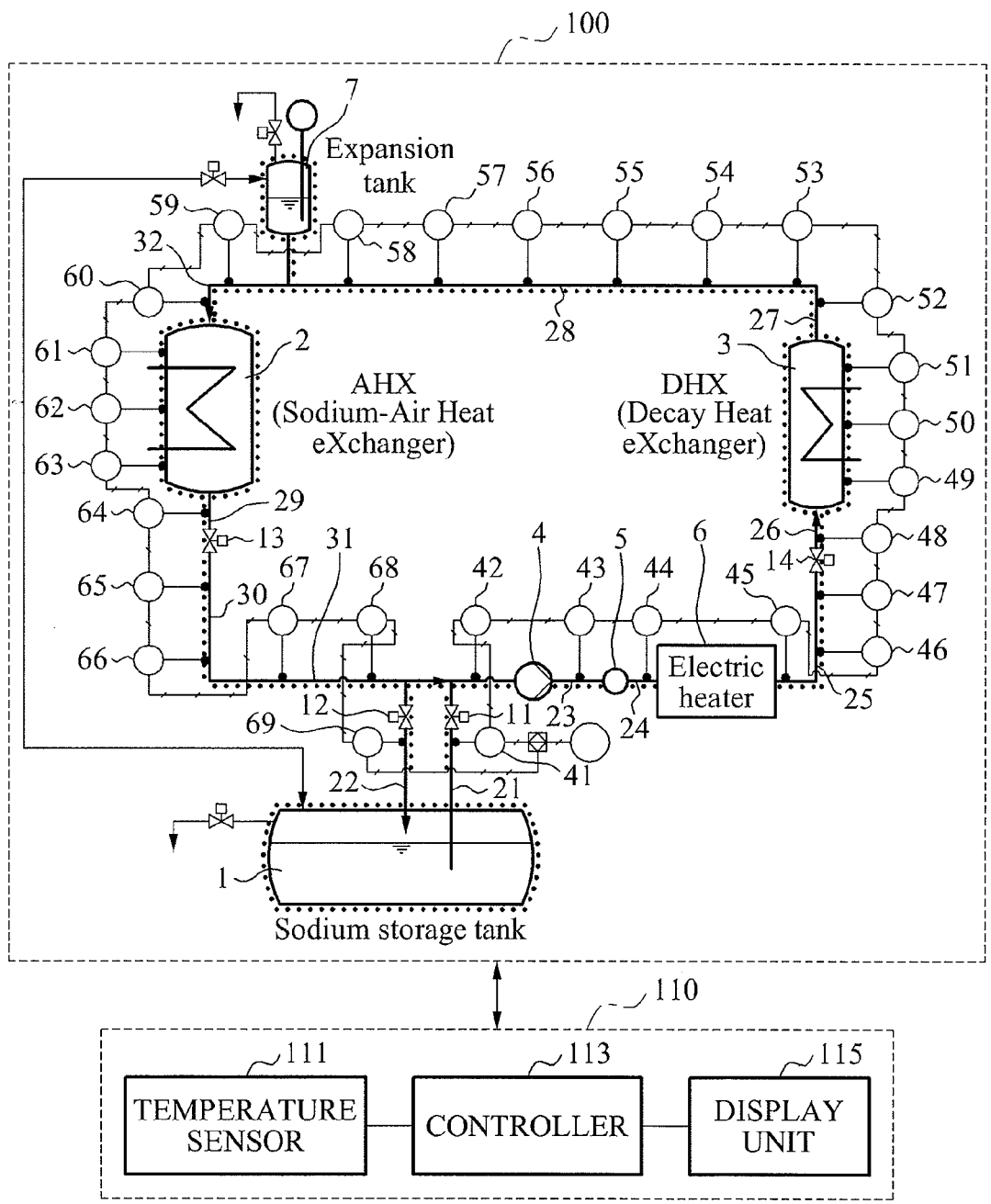
FIG. 1 is a diagram illustrating a heat exchanger system and an apparatus for monitoring a flow of liquid in a pipe according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a heat exchanger system 100 and an apparatus 110 for monitoring a flow of liquid in a pipe according to an embodiment of the present invention.

Referring to FIG. 1, the heat exchanger system 100 may include a sodium storage tank 1, a sodium-air heat exchanger (AHX) 2, a delay heat exchanger (DHX) 3, and an expansion tank 7. Here, each of the tanks and heat exchangers may be connected using pipes.

The sodium storage tank 1 may store sodium, and may transfer the stored sodium to an upper portion when a valve 11 opens in a state in which the expansion tank 7 remains vacuous. Here, the sodium may be transferred to the upper portion to be transferred to the DHX 3 through a flow path including the valve 11, an electromagnetic (EM) pump 4, an EM flowmeter 5, an electric heater 6, and a valve 14, thereby filling an internal portion of the DHX 3. Also, the sodium may be transferred to the AHX 2 through another flow path, thereby filling an internal portion of the AHX 2.

The sodium storage tank 1 may store sodium as a liquid, but may not be limited thereto and may store a molten metal or an aqueous solution including at least one of sodium (Na), lithium (Li), potassium (K), lead (Pb), and bismuth (Bi).

The AHX 2 and the DHX 3 may transfer, to the expansion tank 7, the sodium with which the AHX 2 and the DHX 3 are filled, to fill an internal portion of the expansion tank 7.

That is, the heat exchanger system 100 may fill the internal portion of the expansion tank 7 with sodium along a first flow path from the sodium storage tank 1 to the expansion tank 7 through a pipe 21, the valve 11, the EM pump 4, the EM flowmeter 5, the electric heater 6, a pipe 25, the valve 14, a pipe 26, the DHX 3, a pipe 27, and a pipe 28, or along a second path from the sodium storage tank 1 to the expansion tank 7 through a pipe 22, a valve 12, a pipe 31, a pipe 30, a valve 13, a pipe 29, the AHX 2, and a pipe 32.

When the valve 11 opens in a state in which the expansion tank 7 remains vacuous, the liquid may be pumped, thereby the internal portion of the expansion tank 7 may be filled with the sodium transferred from the AHX 2 and DHX 3.

The apparatus 110 may include a temperature sensor 111, a controller 113, and a display unit 115.

The temperature sensor 111 may be attached to a pipe of the heat exchanger system 100 to measure a temperature of the pipe periodically. The temperature sensor 111 may correspond to, for example, a plurality of thermocouples 41, 42, 43, 44, 45, 46, 47, 48, 49, 50, 51, 52, 53, 54, 55, 56, 57, 58, 59, 60, 61, 62, 63, 64, 65, 66, 67, 68, and 69.

The temperature sensor 111 may be attached to an outer wall of the pipe or an internal portion of the pipe. However, when a great risk for leaks of liquid exists after the temperature sensor 111 is attached to the pipe, the temperature sensor 111 may be attached to the outer wall of the pipe without making a hole in the pipe.

The controller 113 may determine whether a liquid is present in the pipe based on a change in the measured temperature. When a value of the change in temperature is greater than a predetermined threshold during a predetermined time period, the controller 113 may determine that a liquid is present in the pipe. For example, when the value of the change of temperature according to a time is greater than 1° C./sec, the controller 113 may determine that the pipe is filled with the liquid up to a point of the pipe at which a thermocouple is disposed.

The controller 113 may set the predetermined threshold to be relatively small when a thickness of the pipe is relatively thick, or when a difference between a default temperature of the pipe and a default temperature of the liquid is relatively small.

The controller 113 may provide, through the display unit 115, an indicator indicating whether a liquid is present in the pipe.

For example, the controller 113 may turn a first indicator ON when it is determined that a liquid is present within a first point of the pipe based on a first change in a temperature measured by a temperature sensor attached at the first point of the pipe, and may turn a second indicator ON when it is determined a liquid is present within a second point of the pipe based on a second change in a temperature measured by a temperature sensor attached at the second point a predetermined distance apart from the first point. The controller 113 may provide a state of the flow of the liquid from the first point to the second point in the pipe by turning ON the first indicator and the second indicator, sequentially.

Also, the controller 113 may indicate whether a liquid is present by changing a mapping color in the pipe when it is determined a liquid is present within a point at which a temperature sensor is attached to the pipe.

The display unit 115 may include a monitoring lamp as an indicator, and the indicator may be turned ON or OFF by the controller 113. The display unit 115 may include a plurality of monitoring lamps corresponding to the plurality of thermocouples.

Figure 2:
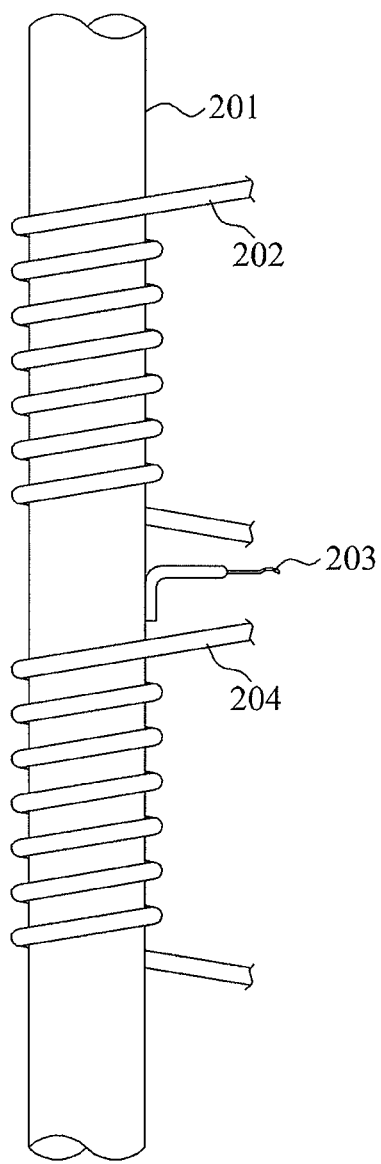
FIG. 2 is a diagram illustrating a temperature sensor of an apparatus for monitoring a flow of liquid attached to a pipe according to an embodiment of the present invention.

FIG. 2 is a diagram illustrating a temperature sensor of an apparatus for monitoring a flow of liquid attached to a pipe according to an embodiment of the present invention.

Referring to FIGS. 1 and 2, each of the pipes 21, 22, 23, 24, 25, 26, 27, 28, 29, 30, 31, and 32 may be coiled with heaters 202 and 204.

The thermocouples 41, 42, 43, 44, 45, 46, 47, 48, 49, 50, 51, 52, 53, 54, 55, 56, 57, 58, 59, 60, 61, 62, 63, 64, 65, 66, 67, 68, and 69, as temperature sensors, may be attached to the pipes 21, 22, 23, 24, 25, 26, 27, 28, 29, 30, 31, and 32 in a manner such that a thermocouple 203 is attached to an outer wall of a pipe 201.

Figure 3:
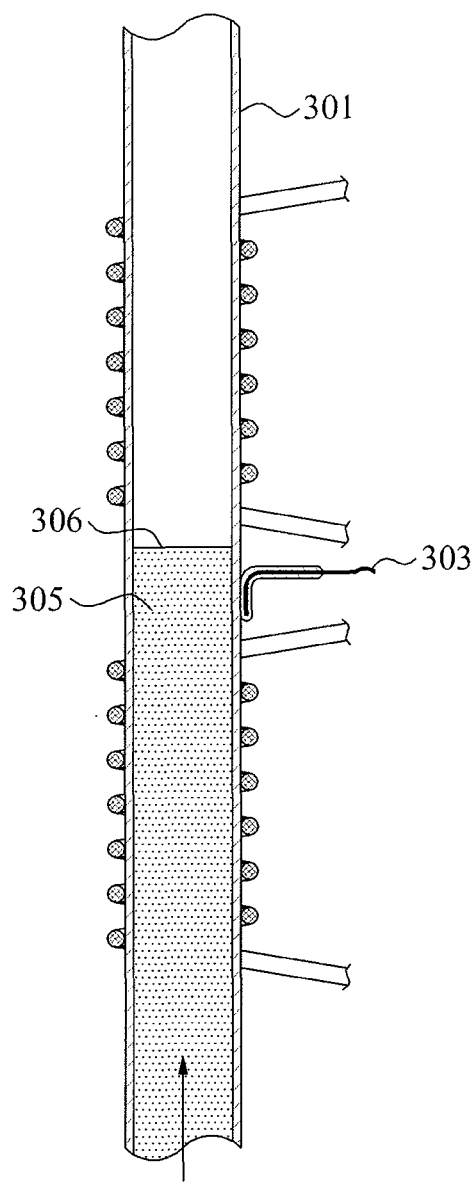
FIG. 3 is a cross-sectional view of a pipe filled with a liquid according to an embodiment of the present invention.

FIG. 3 is a cross-sectional view of a pipe filled with a liquid according to an embodiment of the present invention.

Referring to FIG. 3, when a surface 306 of a liquid 305 passes by a thermocouple 303 as a pipe 301 is being filled with the liquid 305, a change in temperature of the thermocouple 303 may occur. The change in temperature may correspond to a phenomenon occurring when a temperature of the pipe 301 and a temperature of the liquid 305 are different at an initial operation of a heat exchanger system. The change in temperature may occur since a state of a temperature that the pipe 301 may reach when the pipe 301 is heated in a state in which a liquid is absent may be different from a state of a temperature that the pipe 301 may reach when the pipe 301 is heated in a state in which the pipe 301 is filled with the liquid.

When it is determined that the pipe 301 is filled with the liquid 305, an apparatus for monitoring a flow of liquid in a pipe may display a mapping color in the pipe 301 by distinguishing a portion not yet filled with the liquid 305 from a portion filled with the liquid 305, thereby enabling intuitive verification regarding whether the liquid is present.

Figure 4:
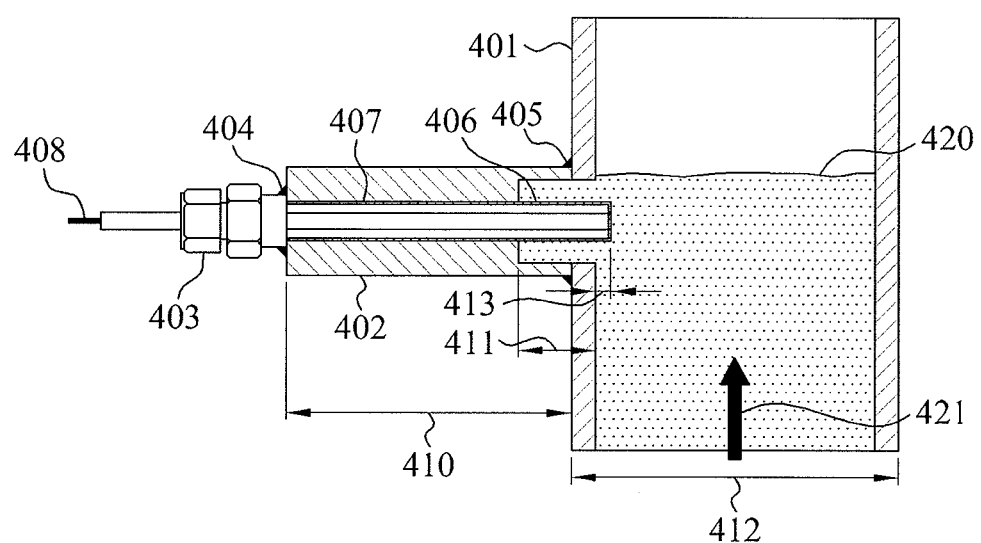
FIG. 4 is a diagram illustrating a temperature sensor of an apparatus for monitoring a flow of liquid attached to a pipe according to another embodiment of the present invention.

FIG. 4 is a diagram illustrating a temperature sensor of an apparatus for monitoring a flow of liquid attached to a pipe according to another embodiment of the present invention.

Referring to FIG. 4, a thermocouple 408 may be inserted in an internal portion of a pipe 401 as a temperature sensor. The thermocouple 408 may be inserted to a relatively deep position of the internal portion of the pipe 401. However, the thermocouple 408 may need to be installed at as a low an insertion length as possible since the thermocouple 408 may be damaged by a flow 421 of a liquid 420 when the thermocouple 408 interrupts the flow 421 of the liquid 420 or when the insertion length is relatively long.

The thermocouple 408 may be installed by welding a thermocouple length expansion pipe 402 to the pipe 401, inserting a thermocouple protecting pipe 407 to the inside of the thermocouple length expansion pipe 402 and welding the thermocouple protecting pipe 407, and welding 404 a thermocouple coupling connector 403 to an end of the thermocouple length expansion pipe 402. The thermocouple 408 may be inserted into the thermocouple protecting pipe 407 to the end of the thermocouple 408, and the thermocouple coupling connector 403 may be tightened. A length of a thermocouple insertion pipe may be set to about 5 millimeters (mm) 413 in an internal portion of a pipe diameter 412, a thermocouple protecting insertion pipe may dispose a protecting pipe 406 so that a portion 411 greater than a diameter of the thermocouple protecting pipe 407, by a factor of at least ten, may be exposed to the liquid 420 in the thermocouple length expansion pipe 402.

Figure 5:
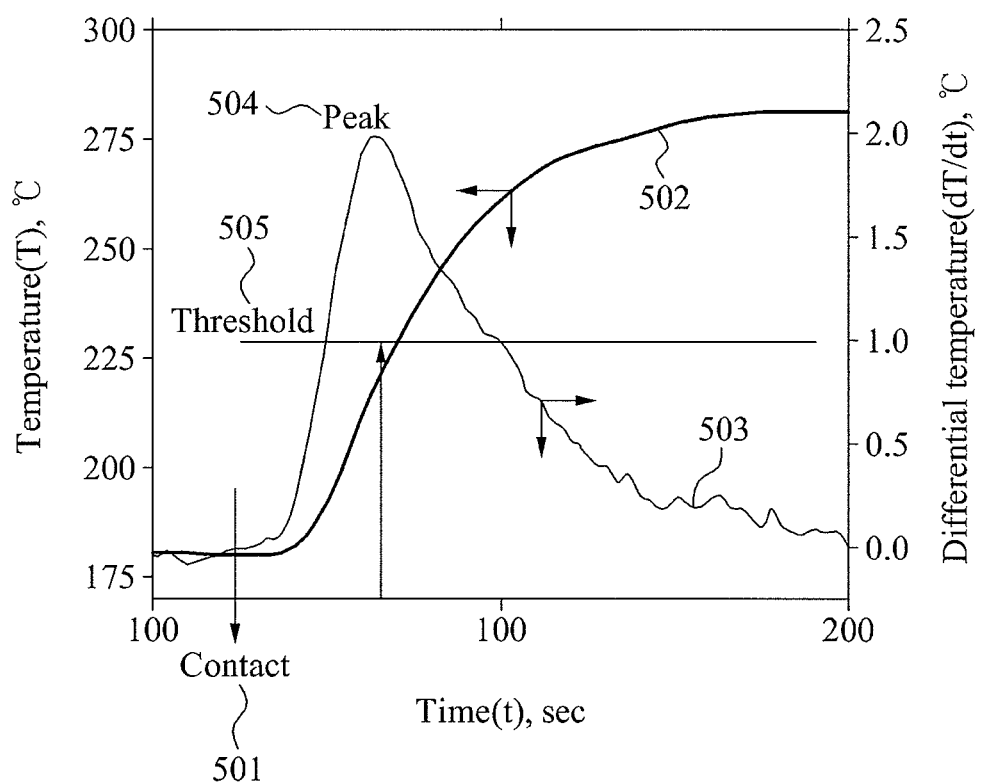
FIG. 5 is a graph illustrating a change in temperature measured by a temperature sensor of an apparatus for monitoring a flow of liquid attached to a pipe according to an embodiment of the present invention.

FIG. 5 is a graph illustrating a change in temperature measured by a temperature sensor of an apparatus for monitoring a flow of liquid attached to a pipe according to an embodiment of the present invention. Here, a Y-axis of a temperature measurement curve is different from a Y-axis of a differential curve. That is, the Y-axis of the temperature measurement curve corresponds to an axis indicating Temperature on a left side of the graph, and the axis Y of the differential curve corresponds to an axis indicating Differential temperature on a right side of the graph.

Referring to FIG. 5, the apparatus may measure a temperature using a thermocouple installed on an outer wall of a pipe when the pipe is filled with a liquid at a contact point 501, and may obtain a curve of temperate change rate according to a time as a result of differentiating a result 502 of the measurement based on a time, as the temperature changes over time.

The differential curve may have a peak 504. For example, when a rate of temperature increase is greater than a predetermined threshold, for example, 1° C./sec, it may be understood that the pipe is filled with the liquid up to a point of the pipe at which the thermocouple is disposed. Here, the predetermined threshold tends to be relatively small when a thickness of the pipe is relatively thick, or when a difference between a temperature of the pipe and a temperature of the liquid is relatively small. Conversely, the predetermined threshold tends to be relatively great when the reverse holds true.

When the rate of temperature increase is greater than a threshold 505, the apparatus may change a color of an indicator by turning the indicator ON, for example, changing the color from colorless to red, thereby intuitively verifying that the pipe is filled with the liquid up to the point of the pipe at which the thermocouple is disposed.

Figure 6:
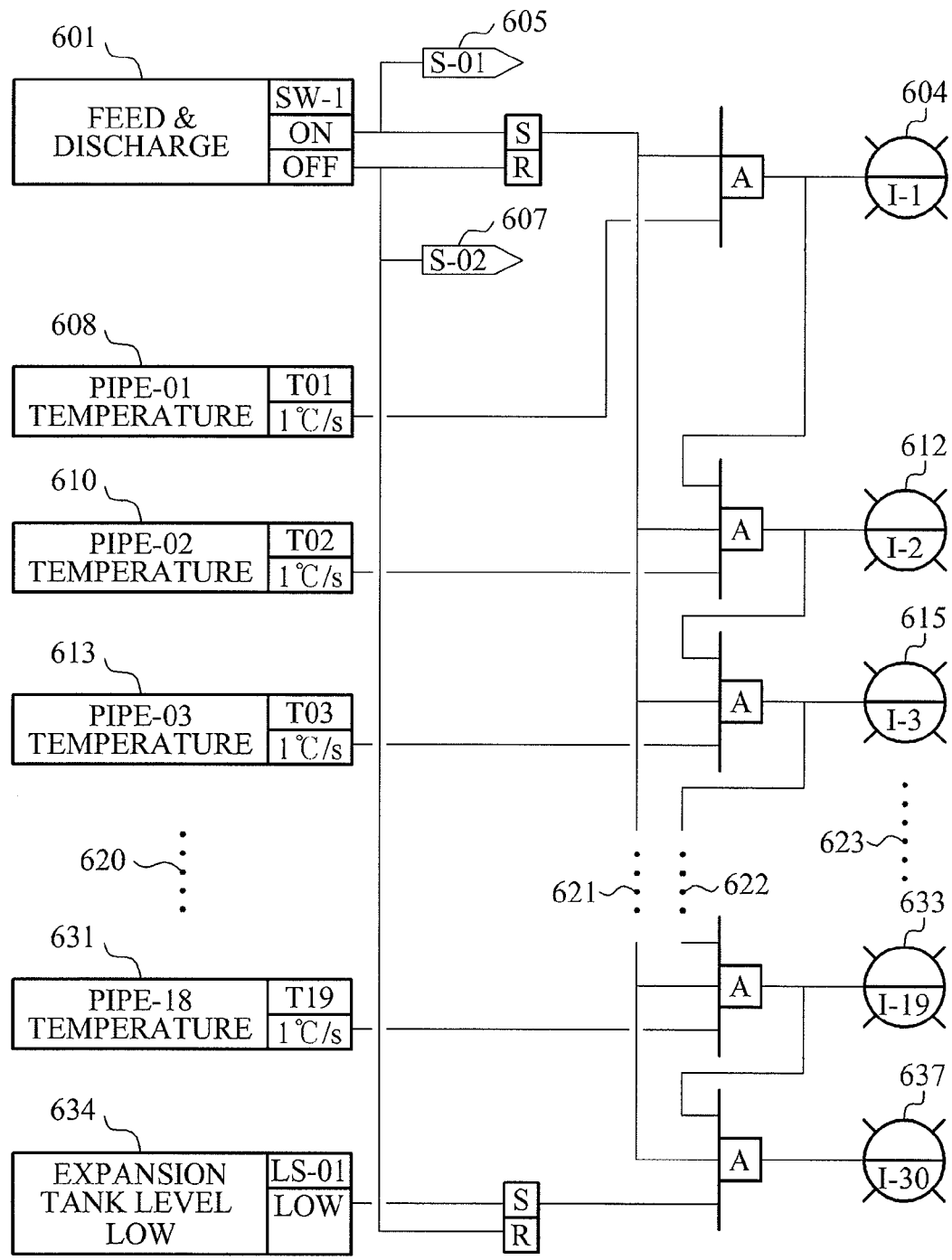
FIG. 6 is a diagram illustrating a monitoring logic for determining a state of a flow of liquid in a pipe through a decay heat exchanger (DHX) in an apparatus for monitoring a flow of liquid attached to a pipe according to an embodiment of the present invention.

FIG. 6 is a diagram illustrating a monitoring logic for determining a state of a flow of liquid in a pipe through a DHX in an apparatus for monitoring a flow of liquid attached to a pipe according to an embodiment of the present invention.

Referring to FIG. 6, the apparatus may operate a temperature measurement switch SW-1 601 in conjunction with a transfer of a liquid, to an upper portion, in a heat exchanger system being performed.

When the switch SW-1 601 is turned ON, the apparatus may turn ON a monitoring lamp 604 in a first pipe section if the switch SW-1 601 is in operation 605 based on a flip-flop logic, and a value of a change in temperature measured by a temperature sensor T01 608 installed in the first pipe section is greater than a predetermined threshold, for example, 1° C./sec, simultaneously.

The apparatus may turn ON a monitoring lamp 612 in a second pipe section if the switch SW-1 601 is in operation 605 based on the flip-flop logic, a value of a change in temperature measured by a temperature sensor T02 610 installed in the second pipe section is greater than the predetermined threshold, for example, 1° C./sec, and the monitoring lamp 604 in the first pipe section is turned ON, simultaneously.

The apparatus may turn ON a monitoring lamp 615 in a third pipe section if the switch SW-1 601 is in operation 605 based on the flip-flop logic, a value of a change in temperature measured by a temperature sensor T03 613 installed in the third pipe section is greater than the predetermined threshold, for example, 1° C./sec, and the monitoring lamp 612 in the second pipe section is turned ON, simultaneously.

The apparatus may perform operations 620, 621, 622, and 623 repetitively, and may turn ON a monitoring lamp 633 in a nineteenth pipe section if the switch SW-1 601 is in operation 605 based on the flip-flop logic, a value of a change in temperature measured by a temperature sensor T19 631 installed in the nineteenth pipe section is greater than the predetermined threshold, for example, 1° C./sec, and a monitoring lamp in a eighteenth pipe section is turned ON, simultaneously.

The apparatus may turn ON a monitoring lamp 637 in a twentieth pipe section if the switch SW-1 601 is in operation 605 based on the flip-flop logic, a signal value of a level of flip-flop in a level sensor LS-01 634 installed in the twentieth pipe section and the expansion tank 7 of FIG. 1 is greater than a predetermined value, and the monitoring lamp 633 in the nineteenth pipe section is turned ON, simultaneously.

Meanwhile, the apparatus may operate the temperature measurement switch SW-1 601 when a discharge of a liquid to a lower portion in the heat exchanger system is performed.

When the switch SW-1 601 is turned OFF, the switch SW-1 601 may not be in operation 607 based on the flip-flop logic, and the apparatus may turn OFF all of the monitoring lamps 604, 612, 615, 623, 633, and 637, irrespective of whether a flow path of the pipe is filled with the liquid.

Figure 7:
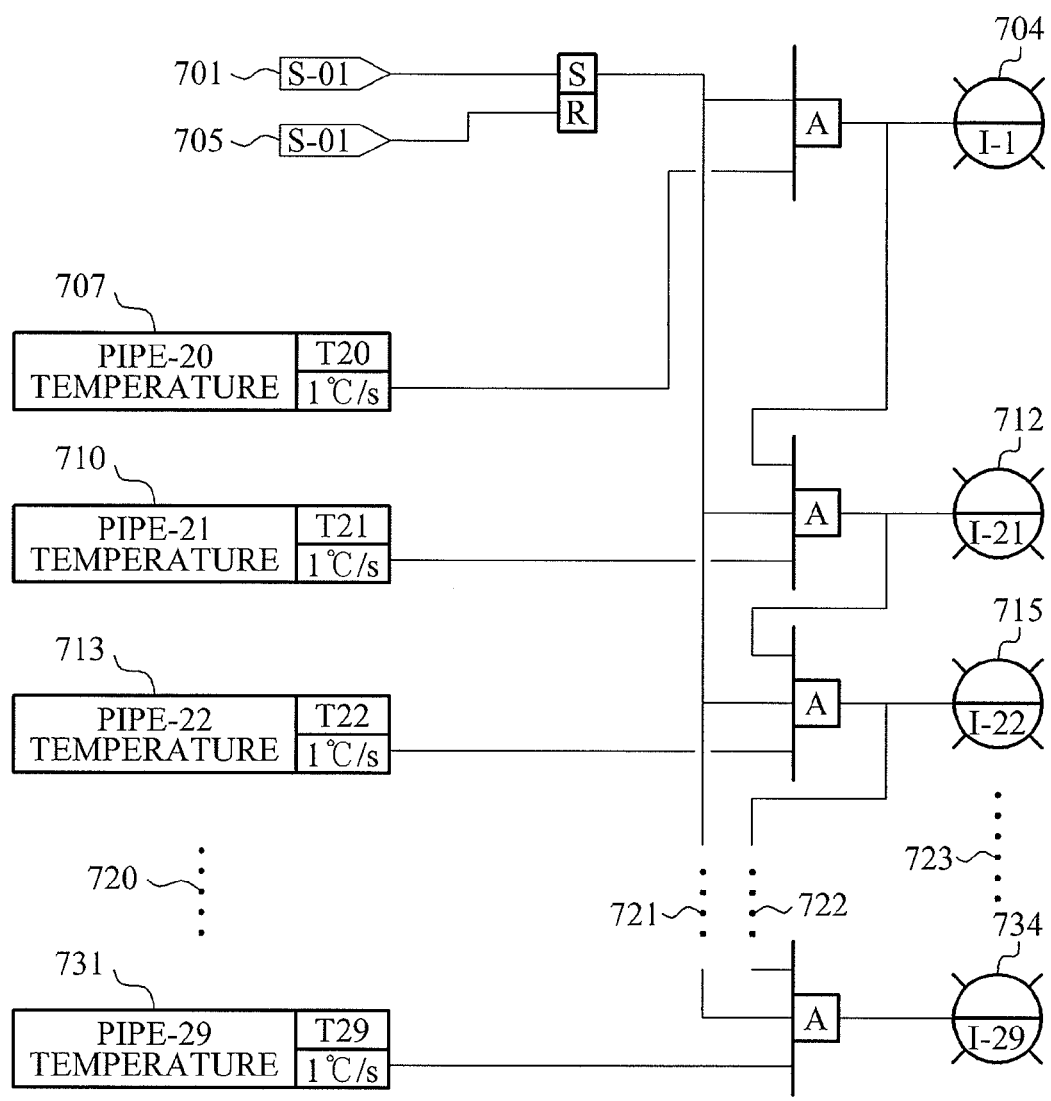
FIG. 7 is a diagram illustrating a monitoring logic for determining a state of a flow of liquid in a pipe through a sodium-air heat exchanger (AHX) in an apparatus for monitoring a flow of liquid attached to a pipe according to an embodiment of the present invention.

FIG. 7 is a diagram illustrating a monitoring logic for determining a state of a flow of liquid in a pipe through an AHX in an apparatus for monitoring a flow of liquid attached to a pipe according to an embodiment of the present invention.

Referring to FIG. 7, the apparatus may operate a temperature measurement switch in conjunction with a transfer of a liquid, to an upper portion, in a heat exchanger system being performed.

When the switch is turned ON, the apparatus may turn ON a monitoring lamp 704 in a first pipe section if the switch is in operation 701 based on a flip-flop logic, and a value of a change in temperature measured by a temperature sensor T20 707 installed in a twentieth pipe section is relatively greater than a predetermined threshold, for example, 1° C./sec, simultaneously.

The apparatus may turn ON a monitoring lamp 712 in a twenty-first pipe section if the switch is in operation 701 based on the flip-flop logic, a value of a change in temperature measured by a temperature sensor T21 710 installed in the twenty-first pipe section is greater than the predetermined threshold, for example, 1° C./sec, and the monitoring lamp 704 in the twentieth pipe section is turned ON, simultaneously.

The apparatus may turn ON a monitoring lamp 715 in a twenty-second pipe section if the switch is in operation 701 based on the flip-flop logic, a value of a change in temperature measured by a temperature sensor T22 713 installed in the twenty-second pipe section is relatively greater than the predetermined threshold, for example, 1° C./sec, and the monitoring lamp 712 in the twenty-first pipe section is turned ON, simultaneously.

The apparatus may perform processes 720, 721, 722, and 723 repetitively, and may turn ON a monitoring lamp 734 in a twenty-ninth pipe section if the switch in operation 701 based on the flip-flop logic, a value of a change in temperature measured by a temperature sensor T29 731 installed in the twenty-ninth pipe section is relatively greater than the predetermined threshold, for example, 1° C./sec, and a monitoring lamp in a preceding pipe section is turned ON, simultaneously.

Meanwhile, the apparatus may operate the temperature measurement switch when a discharge of a liquid, to a lower portion, in the heat exchanger system is performed. When the switch is turned OFF, the switch may not be in operation 705 based on the flip-flop logic, and the apparatus may turn OFF all of the monitoring lamps 704, 712, 715, 723, and 734, irrespective of whether a flow path of the pipe is filled with the liquid.

Figure 8:
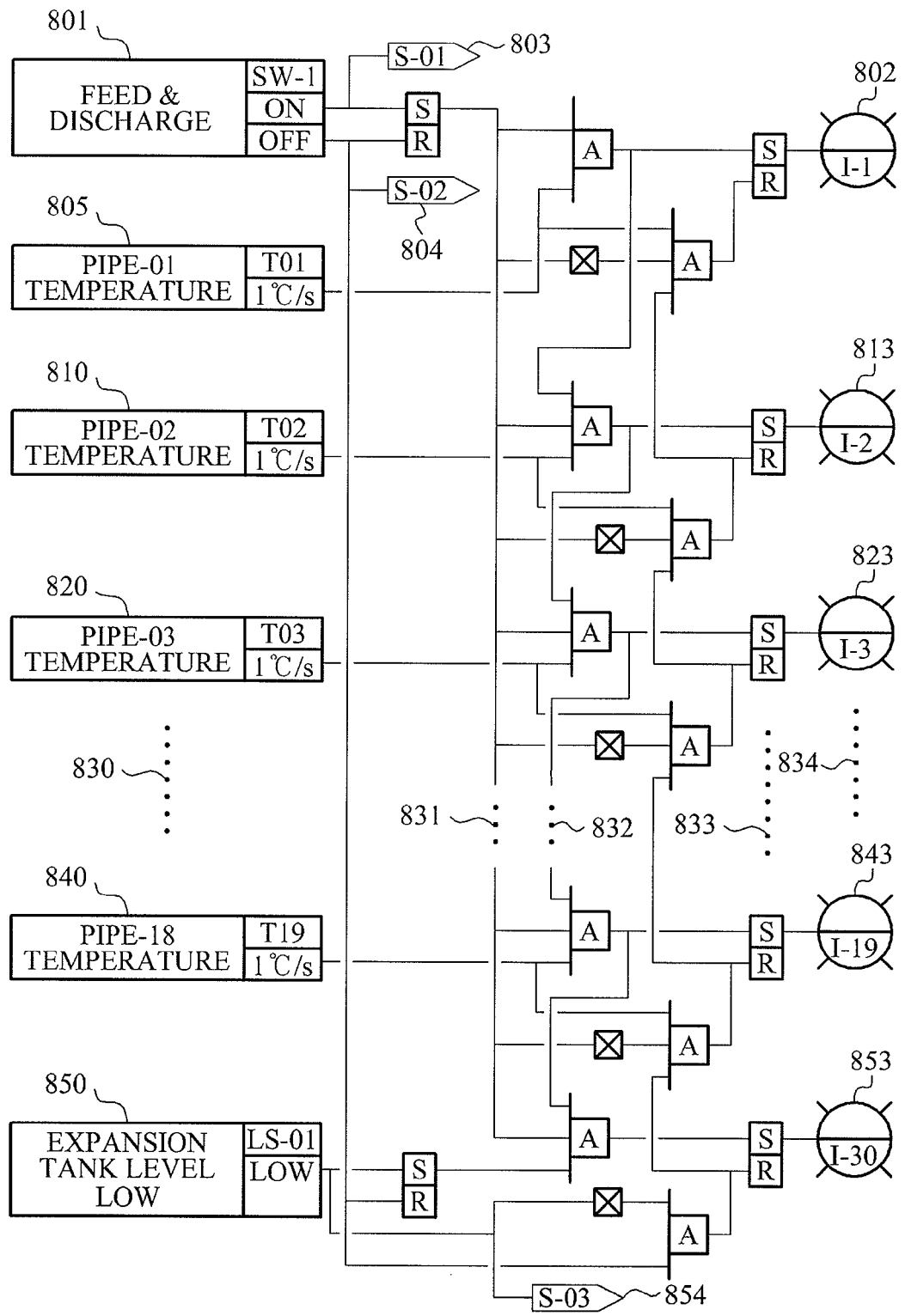
FIG. 8 is a diagram illustrating a monitoring logic for determining a state of a flow of liquid in a pipe through a DHX in an apparatus for monitoring a flow of liquid attached to a pipe according to another embodiment of the present invention.

FIG. 8 is a diagram illustrating a monitoring logic for determining a state of a flow of liquid in a pipe through a DHX in an apparatus for monitoring a flow of liquid attached to a pipe according to another embodiment of the present invention.

Referring to FIG. 8, when a pipe is filled with a liquid, the apparatus may turn ON monitoring lamps 802, 813, 823, 834, 843, and 853 in the same manner as described with reference to FIG. 6.

The apparatus may operate a temperature measurement switch SW-1 801 when a discharge of a liquid, to a lower portion, in a heat exchanger system is performed.

When the switch SW-1 801 is turned OFF, the switch SW-1 801 may not be in operation 804 based on a flip-flop logic, and the apparatus may turn OFF the monitoring lamps 802, 813, 823, 834, 843, and 853, sequentially as the liquid is discharged along a flow path of the pipe.

Figure 9:
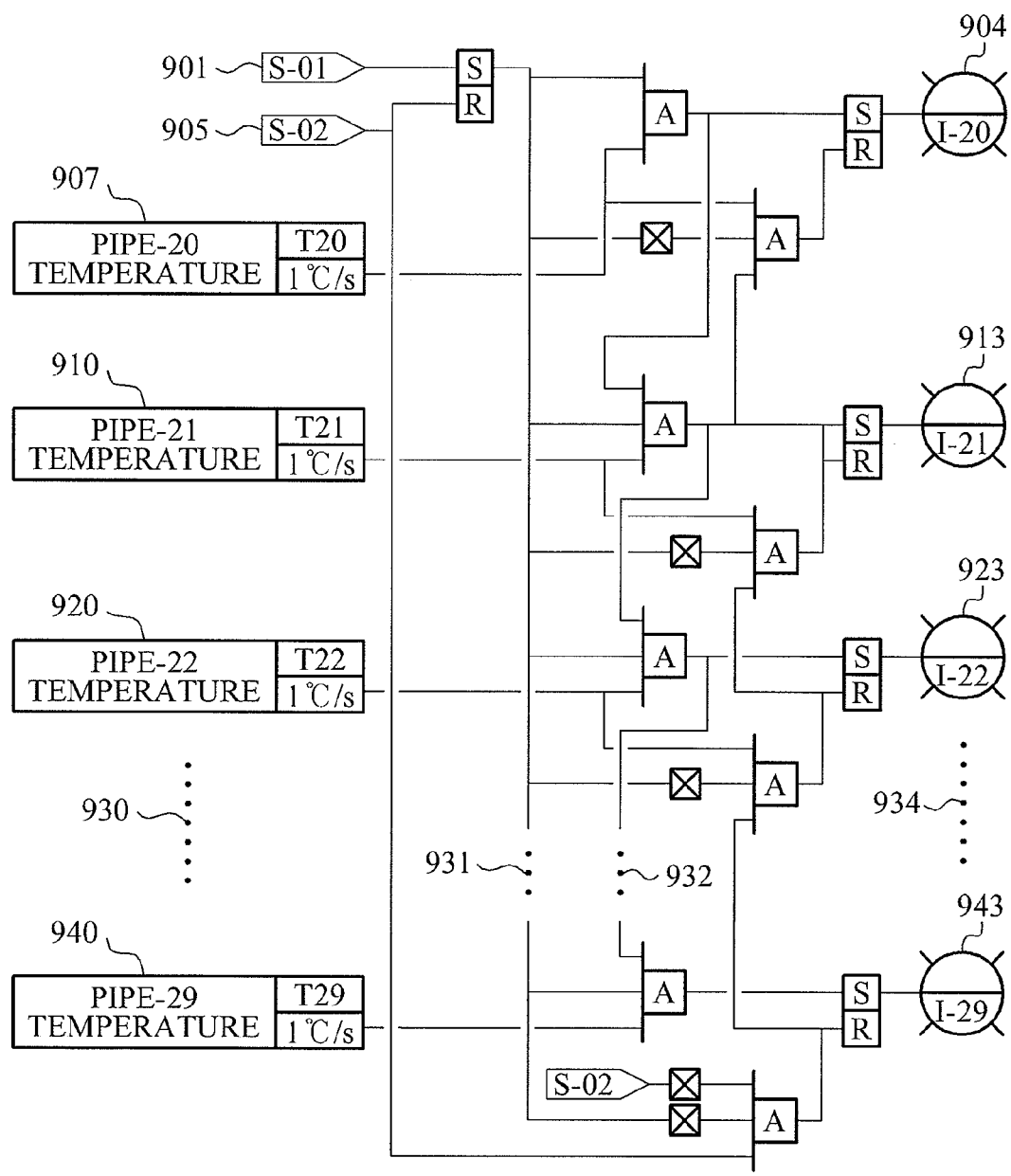
FIG. 9 is a diagram illustrating a monitoring logic for determining a state of a flow of liquid in a pipe through an AHX in an apparatus for monitoring a flow of liquid attached to a pipe according to another embodiment of the present invention.

FIG. 9 is a diagram illustrating a monitoring logic for determining a state of a flow of liquid in a pipe through an AHX in an apparatus for monitoring a flow of liquid attached to a pipe according to another embodiment of the present invention.

Referring to FIG. 9, when a pipe is filled with a liquid, the apparatus may turn ON monitoring lamps 904, 913, 923, 933, and 943 in the same manner as described with reference to FIG. 7.

The apparatus may operate a temperature measurement switch when a discharge of a liquid to a lower portion in a heat exchanger system is performed.

When the switch is turned OFF, the switch may not be in operation 901 based on a flip-flop logic, and the apparatus may turn OFF the monitoring lamps 904, 913, 923, 933, and 943, sequentially as the liquid is discharged along a flow path of the pipe.

Figure 10:
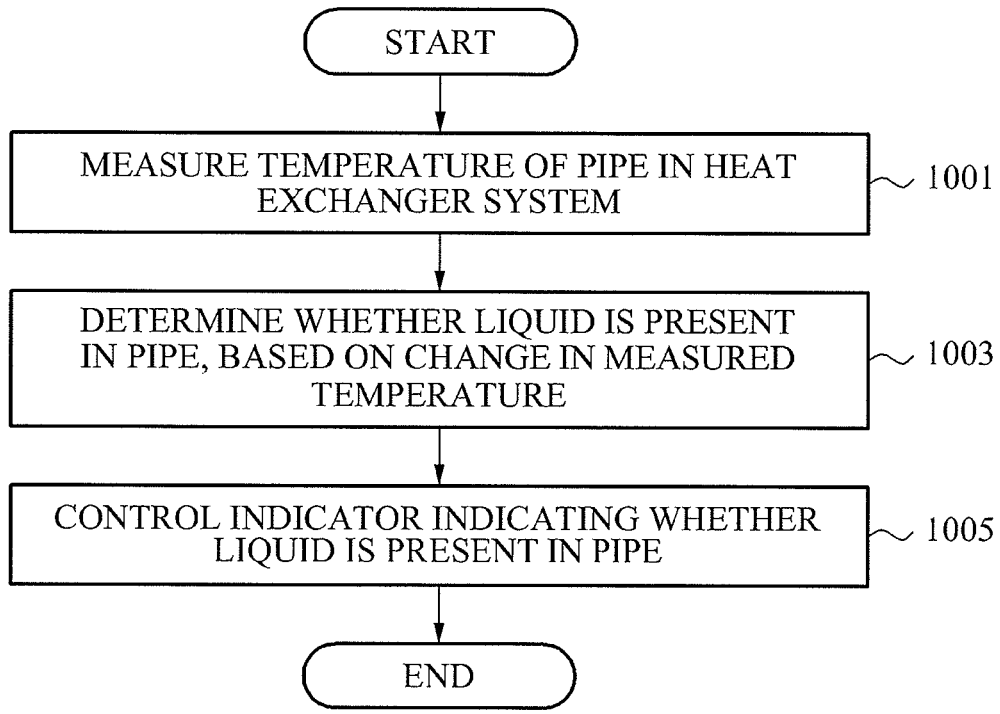
FIG. 10 is a flowchart illustrating a method of monitoring a flow of liquid in a pipe according to an embodiment of the present invention.

FIG. 10 is a flowchart illustrating a method of monitoring a flow of liquid in a pipe according to an embodiment of the present invention.

Referring to FIG. 10, in operation 1001, an apparatus for monitoring a flow of liquid in a pipe may measure a temperature of a pipe in a heat exchanger system.

The apparatus may measure the temperature of the pipe using a temperature sensor, for example, a thermocouple, attached to the pipe in the heat exchanger system.

In operation 1003, the apparatus may determine whether a liquid is present in the pipe based on a change in the measured temperature.

The apparatus may determine that a liquid is present in the pipe when a value of the change in temperature is greater than a predetermined threshold during a predetermined time period. For example, when the value of the change of temperature according to a time is greater than 1° C./sec, the apparatus may determine that the pipe is filled with the liquid up to a point of the pipe at which the thermocouple is disposed.

Here, the predetermined threshold may be set to be relatively small when a thickness of the pipe is relatively thick, or when a difference between a default temperature of the pipe and a default temperature of the liquid is relatively small.

In operation 1005, the apparatus may control an indicator indicating whether a liquid is present.

For example, the apparatus may turn a first indicator ON when it is determined that a liquid is present within a first point of the pipe based on a first change in a temperature measured by a temperature sensor attached at the first point of the pipe, and may turn a second indicator ON when it is determined a liquid is present within a second point of the pipe based on a second change in a temperature measured by a temperature sensor attached at the second point a predetermined distance apart from the first point. Here, the apparatus may provide a state of the flow of the liquid from the first point to the second point in the pipe by turning ON the first indicator and the second indicator, sequentially.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus for monitoring a flow of liquid in a pipe, the apparatus comprising:
   temperature sensors attached at a predetermined first point outside or inside a pipe, and a second point at a distance spaced apart from the first point of a pipe to measure a temperature of the first point of the pipe and a temperature of the second point of the pipe, respectively; and
   a controller having a display unit with a first indicator ON that turns on when it is determined that a liquid is present within the first point of the pipe based on a first change in the temperature measured at the first point of the pipe, said display unit has a second indicator ON that turns on when it is determined a liquid is present within the second point of the pipe based on a second change in the temperature measured at the second point, and provide a state of the flow of the liquid from the first point to the second point in the pipe by turning ON the first indicator and turning ON the second indicator, sequentially when it is determined that a liquid is present at the first point and the second point respectively,
   wherein the controller
   determines that a liquid is present within the first point of the pipe when a value of the first change in the temperature is greater than or equal to a predetermined threshold during a predetermined time period,
   determines that a liquid is present within the second point of the pipe when a value of the second change in the temperature is greater than or equal to the predetermined threshold during the predetermined time period, and
   sets the predetermined threshold to be relatively small when a thickness of the pipe is greater than a set thickness, or when a difference between a default temperature of the pipe and a default temperature of the liquid is less than a set temperature.

2. The apparatus of claim 1, wherein the controller provides, through the display unit, the first indicator and the second indicator indicating whether a liquid is present.

3. The apparatus of claim 1, wherein the temperature sensor is attached to an outer wall or an internal portion of the pipe.

4. The apparatus of claim 1, wherein the liquid corresponds to a molten metal or an aqueous solution comprising at least one of sodium (Na), lithium (Li), potassium (K), lead (Pb), and bismuth (Bi).

5. A method of monitoring a flow of liquid in a pipe, the method comprising:
   measuring a temperature of a predetermined first point outside or inside a pipe, and a temperature of a second point at a distance spaced apart from the first point, respectively the first point of a pipe and a temperature of the second point of the pipe;
   setting a threshold to be relatively small when a thickness of the pipe is greater than a set thickness, or when a difference between a default temperature of the pipe and a default temperature of the liquid is less than a set temperature;
   determining that a liquid is present within the first point of the pipe when a value of the first change in the temperature is greater than or equal to the set threshold during a predetermined time period;
   turning a first indicator ON when it is determined that a liquid is present within the first point of the pipe based on a first change in the temperature measured at the first point of the pipe;
   determining that a liquid is present within the second point of the pipe when a value of the second change in the temperature is greater than or equal to the set threshold during the predetermined time period; and
   turning a second indicator ON when it is determined a liquid is present within the second point of the pipe based on a second change in the temperature measured at the second point, and providing a state of the flow of the liquid from the first point to the second point in the pipe by turning ON the first indicator and turning ON the second indicator, sequentially when it is determined that a liquid is present at the first point and the second point respectively.

6. The method of claim 5, further comprising:
   providing, through a display unit, the first indicator and the second indicator indicating whether a liquid is present.

* * * * *